United States Patent
Amimoto et al.

(10) Patent No.: US 7,379,217 B2
(45) Date of Patent: May 27, 2008

(54) IMAGE READING APPARATUS

(75) Inventors: Mitsura Amimoto, Ibaraki (JP); Tsuyoshi Yamauchi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 1222 days.

(21) Appl. No.: 10/422,510

(22) Filed: Apr. 24, 2003

(65) Prior Publication Data

US 2003/0202222 A1 Oct. 30, 2003

(30) Foreign Application Priority Data

Apr. 26, 2002 (JP) ............................. 2002-126162
Apr. 3, 2003 (JP) ............................. 2003-100635

(51) Int. Cl.
*H04N 1/04* (2006.01)
(52) U.S. Cl. ...................... 358/487; 358/474; 358/475; 358/482; 358/483; 358/486; 358/488; 358/497
(58) Field of Classification Search ................ 358/483, 358/482, 486, 488, 497, 494, 505, 506, 487; 358/512–514, 474; 382/312, 318, 319; 250/208.1, 250/234–236
See application file for complete search history.

(56) References Cited

U.S. PATENT DOCUMENTS

| | | | |
|---|---|---|---|
| 5,036,397 A * | 7/1991 | Nagabusa | 348/311 |
| 5,239,392 A | 8/1993 | Suzuki et al. | |
| 5,315,412 A | 5/1994 | Mihara et al. | |
| 5,781,311 A | 7/1998 | Inoue et al. | |
| 5,912,746 A * | 6/1999 | Cilke et al. | 358/482 |
| 7,034,969 B2 * | 4/2006 | Watanabe | 358/513 |

FOREIGN PATENT DOCUMENTS

| | | |
|---|---|---|
| JP | A 01-284067 | 11/1989 |
| JP | 3-291047 A | 12/1991 |
| JP | 3-291048 A | 12/1991 |
| JP | A 04-035260 | 2/1992 |
| JP | A 08-046753 | 2/1993 |
| JP | U 05-076165 | 10/1993 |
| JP | A 6-152878 | 5/1994 |
| JP | A 08-116408 | 5/1996 |
| JP | A 2000-165598 | 6/2000 |
| JP | A 2001-223849 | 8/2001 |
| JP | A 2002-085392 | 3/2002 |

OTHER PUBLICATIONS

An Office Action from Japanese Patent Office for Appl. No. 2003-100635 mailed Nov. 8, 2004.
English translation of portions of JPU05-076165.

* cited by examiner

*Primary Examiner*—Cheukfan Lee
(74) *Attorney, Agent, or Firm*—Morgan & Finnengan, LLP

(57) ABSTRACT

To set at least the main portion of a read original on an image reading apparatus while avoiding a discontinuous portion, the position of the discontinuous portion of photoelectric conversion element arrays is indicated, or an original holder to be used to set the original while avoiding the discontinuous portion is arranged.

7 Claims, 12 Drawing Sheets

IMAGE READING APPARATUS

FIELD OF THE INVENTION

The present invention relates to an image reading apparatus which reads an image using photoelectric conversion element arrays and, more particularly, to an image reading apparatus which uses an image read sensor having photoelectric conversion element arrays with discontinuous portions.

BACKGROUND OF THE INVENTION

Conventionally, there is an image reading apparatus which reads an image on photographic printing paper or a magazine using an image reading unit having a plurality of photoelectric conversion element arrays that are linearly arranged.

Since the image reading apparatus has the plurality of photoelectric conversion element arrays arranged linearly, the photoelectric conversion element arrays have joints therebetween, and a read image has discontinuous portions corresponding to the joints. However, the size of the gap at each joint is as small as about 60 µm in the current manufacturing technique. When an image on photographic printing paper or a magazine is to be read using a general 1× lens as ever, such a 60-µm joint is negligible relative to the original size.

However, when a function of reading a transparent original such as a photographic film is to be imparted to an image reading apparatus, joints pose a problem. To read and display a small fine image of a photographic film, high-resolution photoelectric conversion element arrays are often used, and a read image is enlarged when displayed in many cases. For this reason, when the resolution of photoelectric conversion element arrays is, e.g., 2,400 dpi, a discontinuous portion/portions of 60-µm gap which corresponds to about six pixels at a resolution of 2,400 dpi is/are formed in an image. The discontinuous portion/portions is/are especially noticeable when the image is enlarged and displaying or printing an enlarged image.

Additionally, the image reading apparatus which reads a transparent original using photoelectric conversion elements has a poorer resolution at an end portion than at the central portion with respect to the main scanning direction because of its optical system structure. Hence, a transparent original is generally read near the central portion.

Recently, however, an image reading apparatus using an contact type image read sensor which contacts with an original glass plate has been developed in order to make the apparatus thin and compact. When a photographic film is to be read by attaching a transparent original irradiation unit to such an apparatus, the upper and lower edges of the film cannot be held by a film holder, hence, the film must be placed directly on the original glass plate while the transparent original irradiation unit is placed on the film. In this case, even a very small shift of the film from the focal point of the contact type image read sensor can result in a decrease in resolution because of a small depth of field.

SUMMARY OF THE INVENTION

The present invention has been made in consideration of the above situation, and has as its object to reduce the influence of gaps between photoelectric conversion element arrays on a read image by a simple and inexpensive arrangement.

According to the present invention, the foregoing object is attained by providing an image reading apparatus which reads an image of an original comprising: an image reading unit having a discontinuous portion of photoelectric conversion element arrays which are linearly arranged; a driving section which makes the original and the image reading unit move relative to each other; and a positioning member used for determining a mounting position of the original so as to prevent the discontinuous portion of the photoelectric conversion element arrays from reading a main portion of an image on the original.

It is another object of the present invention to minimize defocusing caused by variation in accuracy of parts and to prevent defocusing caused by lifting of an original by a simple and inexpensive arrangement.

According to the present invention, the positioning member of the foregoing image reading apparatus comprises a transparent original holder which holds a transparent original, and a support member which supports a position of the transparent original holder so that an effective image area of the transparent original is set outside an area where the discontinuous portion of the photoelectric conversion element arrays scans while the original and the image reading unit are relatively moved to each other, and the image reading apparatus further comprises an original glass plate on which the original is placed; and a plane light source which illuminates the transparent original from an opposite side of the image reading unit with respect to the original glass plate, wherein the plane light source presses the transparent original against the original glass plate.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings. The dimensions, materials, and shapes of components exemplified in the embodiments and the relative arrangement thereof should appropriately be changed in accordance with the arrangement of the apparatus to which the present invention is applied or various conditions. The present invention is not limited to these examples.

First Embodiment

Figure 1A:
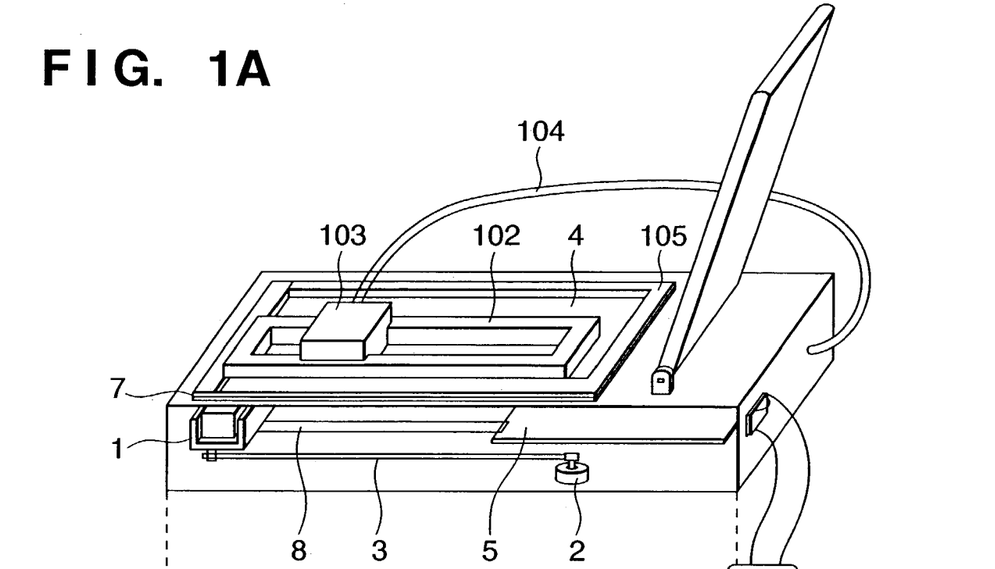
FIGS. 1A to 1C are schematic views showing the basic arrangement of an image reading apparatus according to a first embodiment of the present invention.
Figure 1B:
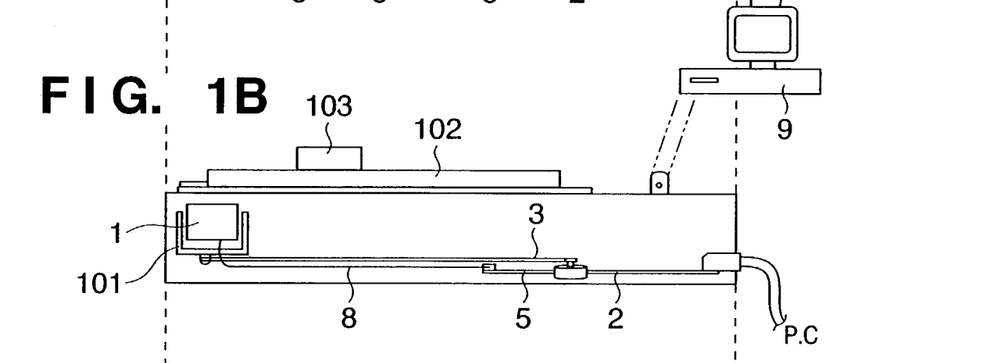
Figure 1C:
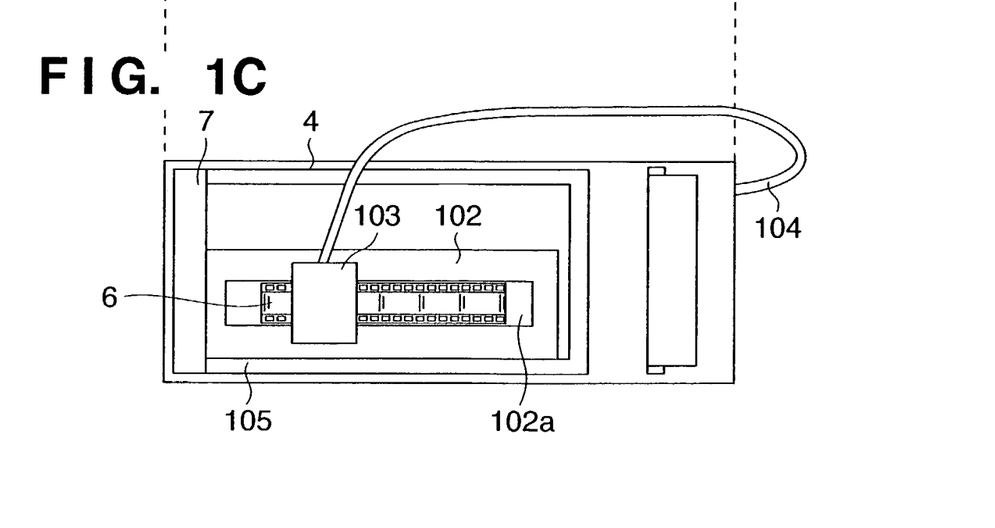

FIGS. 1A to 1C are views showing the arrangement of an image reading apparatus according to the first embodiment of the present invention. FIG. 1A is a perspective view, FIG. 1B is a side view, and FIG. 1C is a plan view. Referring to FIGS. 1A to 1C, reference numeral 1 denotes an image reading unit; 2, a stepping motor; 3, a driving belt; 4, an original glass plate; 5, a control board; 6, a 35-mm photographic film; 7, an original regulating plate which also serves as a white reference plate; 8, a flat cable; 9, an external computer; 101, a carriage to which the image reading unit 1 is attached; 102, a film holder which is detachable from the image reading apparatus and stabilizes the 35-mm photographic film 6; 103, a film light source unit detachable from the image reading apparatus; 104, a cable which connects the film light source unit 103 to the control board 5; and 105, an original regulating plate.

Figure 2:
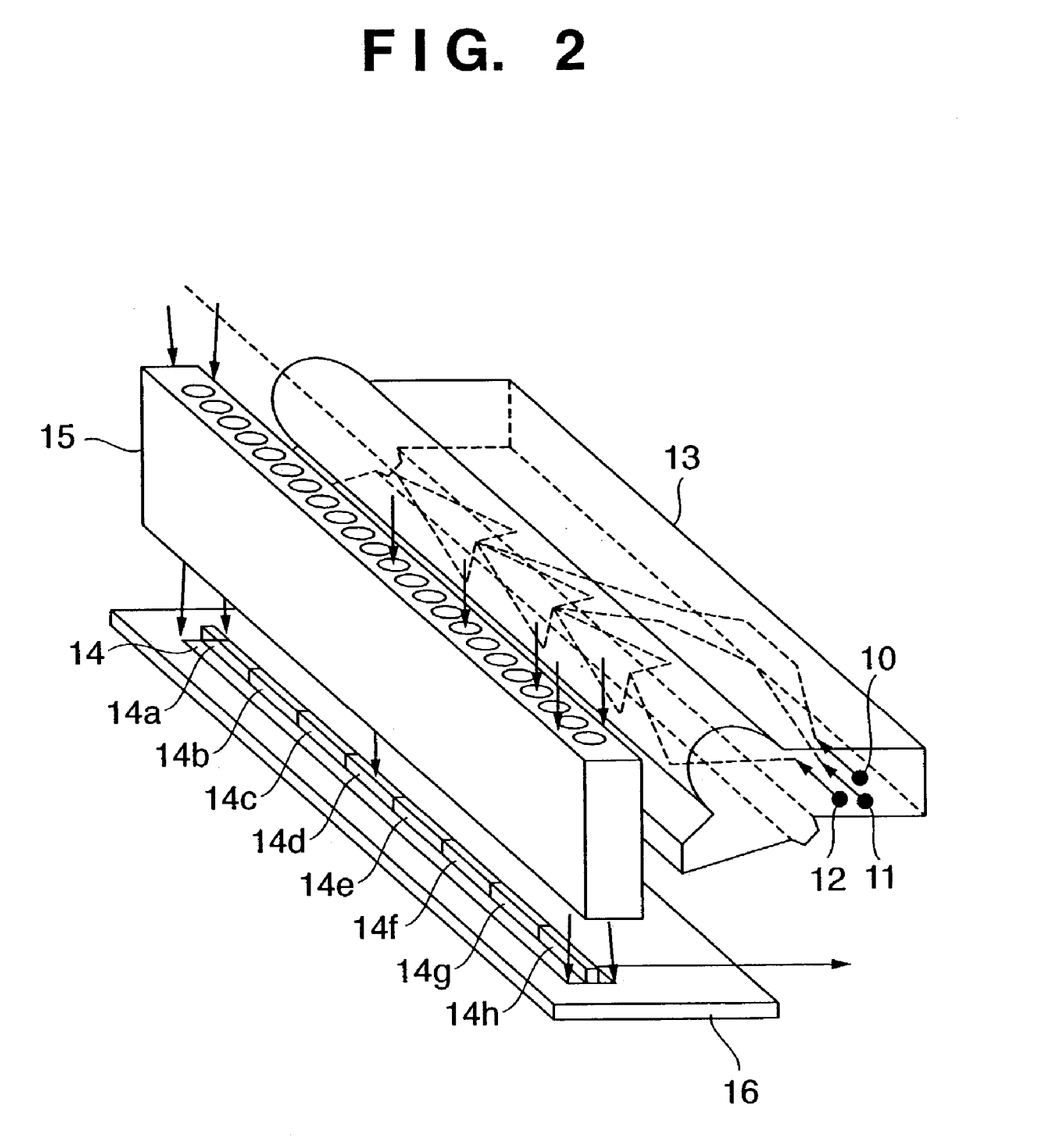
FIG. 2 is a view showing the arrangement of an image reading unit of the image reading apparatus according to the first embodiment of the present invention.

FIG. 2 is a perspective view showing the arrangement of the image reading unit 1. Reference numerals 10, 11, and 12 denote red, green and blue LEDs, respectively. Reference numeral 13 denotes a light guide 13; 14, a linear image sensor formed from photoelectric conversion elements; 15, a rod lens array; and 16, a board to which the photoelectric conversion elements are attached.

The stepping motor 2 is driven by the control board 5. The driving force is transmitted to the carriage 101, i.e., the image reading unit 1 through the belt 3. The image reading unit 1 scans an object placed on the original glass plate 4 while continuously moving along the original glass plate 4.

As shown in FIG. 2 the linear image sensor 14 attached to the image reading unit 1 is arranged along the longitudinal direction of the image reading unit 1. In the first embodiment, the reading unit has a density of 2,400 dpi in the widthwise direction of an A4 original. The linear image sensor 14 has eight photoelectric conversion element arrays 14a to 14h which are linearly arranged. The number of elements per photoelectric conversion element array is 2,576, and thus, total of 20,608 photoelectric conversion elements are arranged on the board 16.

A case wherein an image on a reflective original (not shown) placed on the original glass plate 4 is to be read will be described first. In this case, the film holder 102 and film light source unit 103 are detached from the image reading apparatus.

Light from the LEDs 10, 11, and 12 reaches the upper surface of the original glass plate 4 while being dispersed by the light guide 13 along the longitudinal direction of the image reading unit 1. The light is diffused and reflected by the original placed on the upper surface of the original glass plate 4, converged by the rod lens array 15, and projected onto the linear image sensor 14. As a characteristic feature of the rod lens array 15, the size of an image of the original projected by the rod lens array 15 onto the linear image sensor 14 is the same as the size of the original. Charges are accumulated in the linear image sensor 14 upon receiving the light emitted from the LEDs 10, 11, and 12 and reflected by the original. The charges are stored in a transfer section in the linear image sensor 14 in accordance with a line read start pulse (Hsync) of the next period and output as an electrical signal for each pixel in accordance with an image read clock (clock).

The LEDs 10, 11, and 12 are selectively turned on in response to each line read start pulse (Hsync) so that the LEDs 10, 11, and 12 are sequentially turned on as the image reading unit 1 moves. Image signals of respective colors due to the LEDs 10, 11, and 12 are sent from the control board 5 to the external computer 9 through the flat cable 8. The external computer 9 executes image processing.

A case wherein the 35-mm photographic film 6 as a transparent original is to be read in the first embodiment will be described next. In this case, the film holder 102 and film light source unit 103 are used to read the film 6.

Figure 3:
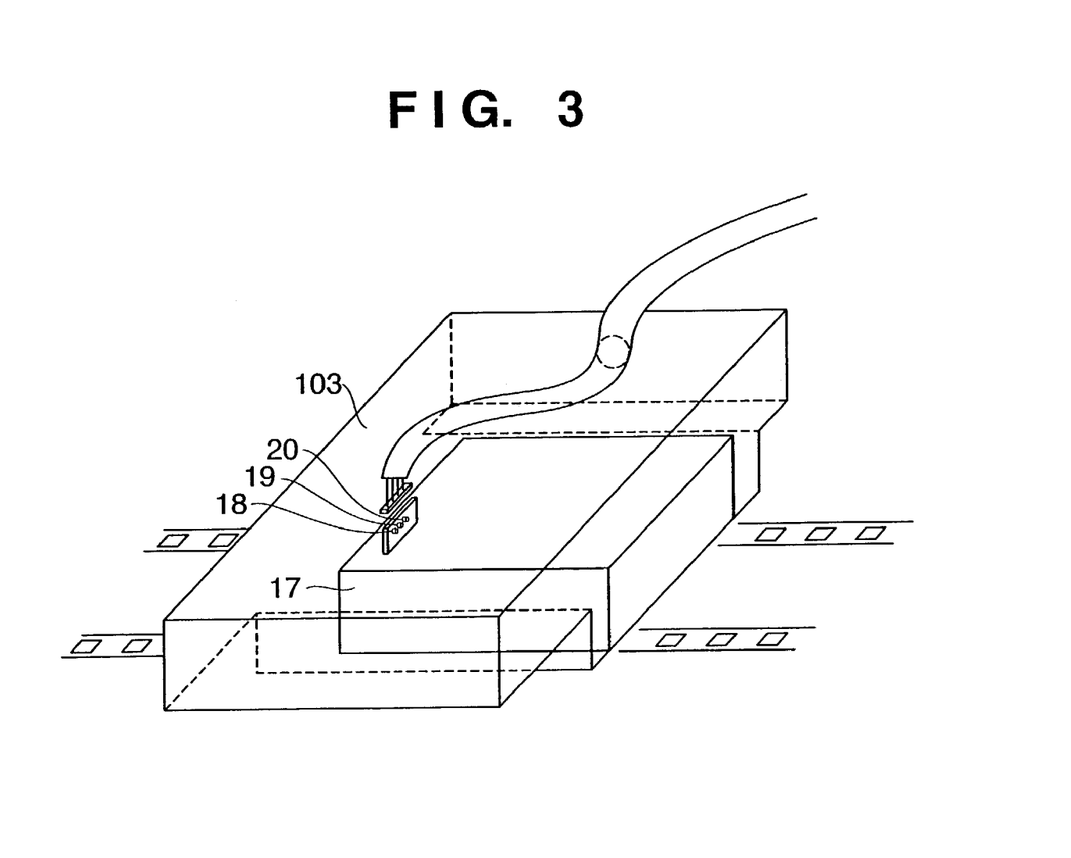
FIG. 3 is a view showing the arrangement of a film light source unit of the image reading apparatus according to the first embodiment of the present invention.

FIG. 3 is a view showing the arrangement of the film light source unit 103 to be used to read the 35-mm photographic film 6. The film light source unit 103 incorporates a plane light source 17, red LED 18 for film, green LED 19 for film, and blue LED 20 for film. As the plane light source 17 of the first embodiment, a plane light source described in, e.g., Japanese Patent Laid-Open No. 2001-34210 may be used. Light from each LED is emitted as uniform light from the lower surface of the plane light source 17. The effective light-emitting surface of the plane light source 17 of the first embodiment has an size of 50 mm×25 mm. Hence, the plane light source 17 can irradiate the effective image area of one frame of the 35-mm photographic film 6, i.e., an area having a size of about 36 mm×24 mm. The 35-mm photographic film 6 is placed on the original glass plate 4. The film light source unit 103 is set on the upper surface of the 35-mm photographic film 6. The LED light emitted from the film light source unit 103 passes through the 35-mm photographic film and is projected onto the linear image sensor 14 through the rod lens array 15. As in the above-described reflected light reading, the LEDs 18, 19, and 20 are sequentially turned on as the image reading unit 1 moves. The film light source unit 103 does not move, and the image reading unit 1 moves to scan the 35-mm photographic film 6.

Figure 4:
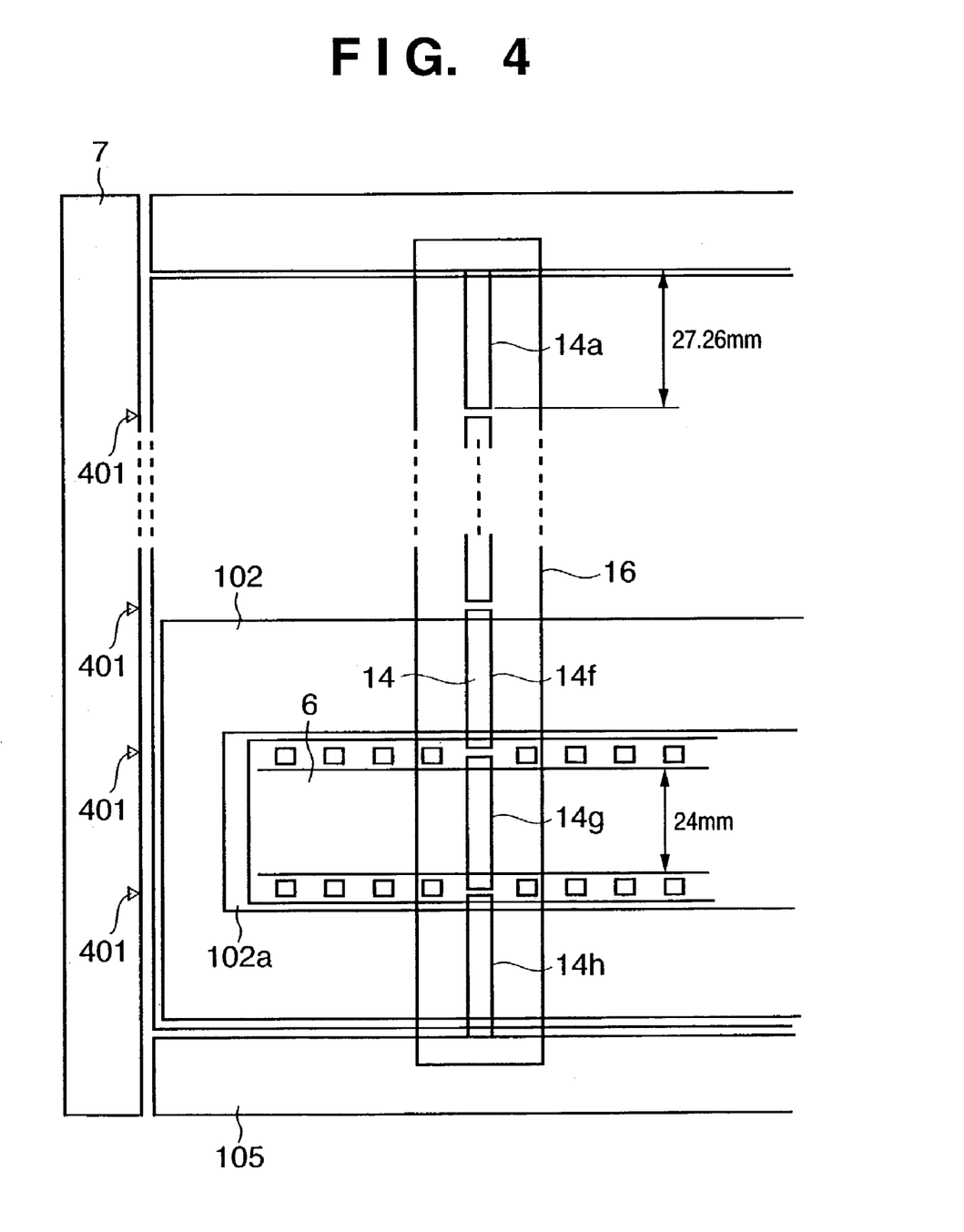
FIG. 4 is a view showing the positional relationship between a 35-mm photographic film and photoelectric conversion element arrays in the image reading unit according to the first embodiment of the present invention.

FIG. 4 is a view for explaining the characteristic feature of the first embodiment. FIG. 4 shows the positional relationship between the linear image sensor 14 and the 35-mm photographic film 6. As shown in FIG. 2, the eight photoelectric conversion element arrays 14a to 14h are linearly arranged in the linear image sensor 14, and joints exist between the arrays. When an image is read, the joints cause a discontinuous portions in a read image. In the first embodiment, when the 35-mm photographic film 6 is to be read, the 35-mm photographic film 6 is set so that the effective image area of the 35-mm photographic film 6 avoids the joints, thereby preventing discontinuous portions from being generated in the read image. In the first embodiment, each of the photoelectric conversion element arrays 14a to 14h has a length of 27.26 mm, and the effective image width of the short side of the 35-mm photographic film 6 is about 24 mm. In the first embodiment, since the rod lens array 15 is a 1× lens, when the short side of the 35-mm photographic film 6 is set within the scan range of a photoelectric conversion element array, e.g., 14g, the 35-mm photographic film 6 can be set while avoiding the joints. In the first embodiment, as shown in FIG. 4, the film guide 102 having the 35-mm photographic film 6 inserted into a hollow portion 102a is caused to abut against the original regulating plates 7 and 105. The dimensions of film guide 102 are determined so that the 24-mm effective image area of the 35-mm photographic film falls within the scan range of one photoelectric conversion element array (e.g., photoelectric conversion element array 14g), while taking errors of the respective members into consideration.

Modification

As shown in the original regulating plate 7 in FIG. 4, marks 401 that indicate the end portions of the photoelectric conversion element arrays 14a to 14h may be formed on the original regulating plate 7 by printing or carving. The 35-mm photographic film 6 may be set with reference to the marks 401. Further, using both the film guide 102 and the marks 401, the film guide 102 may be set at another position. Further, when a large photographic film that cannot be put within the width of one photoelectric conversion element array is to be read, degradation in quality of a portion of interest of the original image can be avoided by placing the portion of interest at a position far from the marks 401. Further, not only a transparent original but also a reflecting original such as photographic printing paper can be arranged in a similar manner.

Second Embodiment

The second embodiment of the present invention will be described next.

Figure 5:
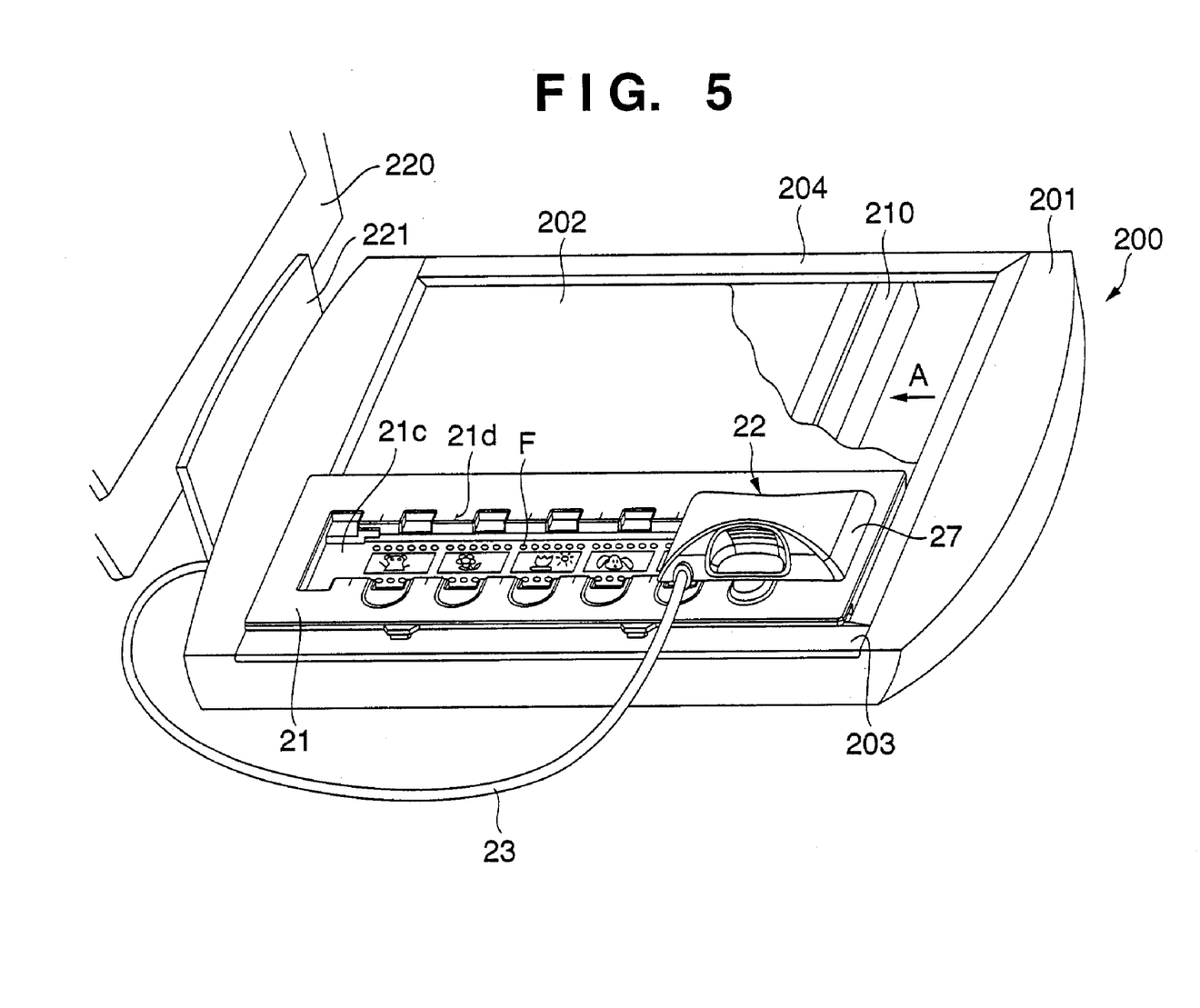
FIG. 5 is a partially cutaway perspective view showing the arrangement of an image reading apparatus according to a second embodiment of the present invention.

FIG. 5 is a partially cutaway perspective view showing the arrangement of an image reading apparatus according to the second embodiment of the present invention. Referring to FIG. 5, reference numeral 21 denotes a film holder detachable from the image reading apparatus; 22, a transparent original irradiation unit; 23, a cable; 200, a scanner main body; 201, a base frame; 202, an original glass plate; 203 and 204, glass frames; 210, an image reading unit; 220, a platen cover; and 221, a hinge of the platen cover.

The image reading unit 210 has the same arrangement as that of the image reading unit described in the first embodiment with reference to FIG. 2. The image of an object (not shown) placed on the original glass plate 202 can be read in the same way as described above in the first embodiment.

A case wherein a 35-mm photographic film F as a transparent original is to be read in the second embodiment will be described next.

Figure 6:
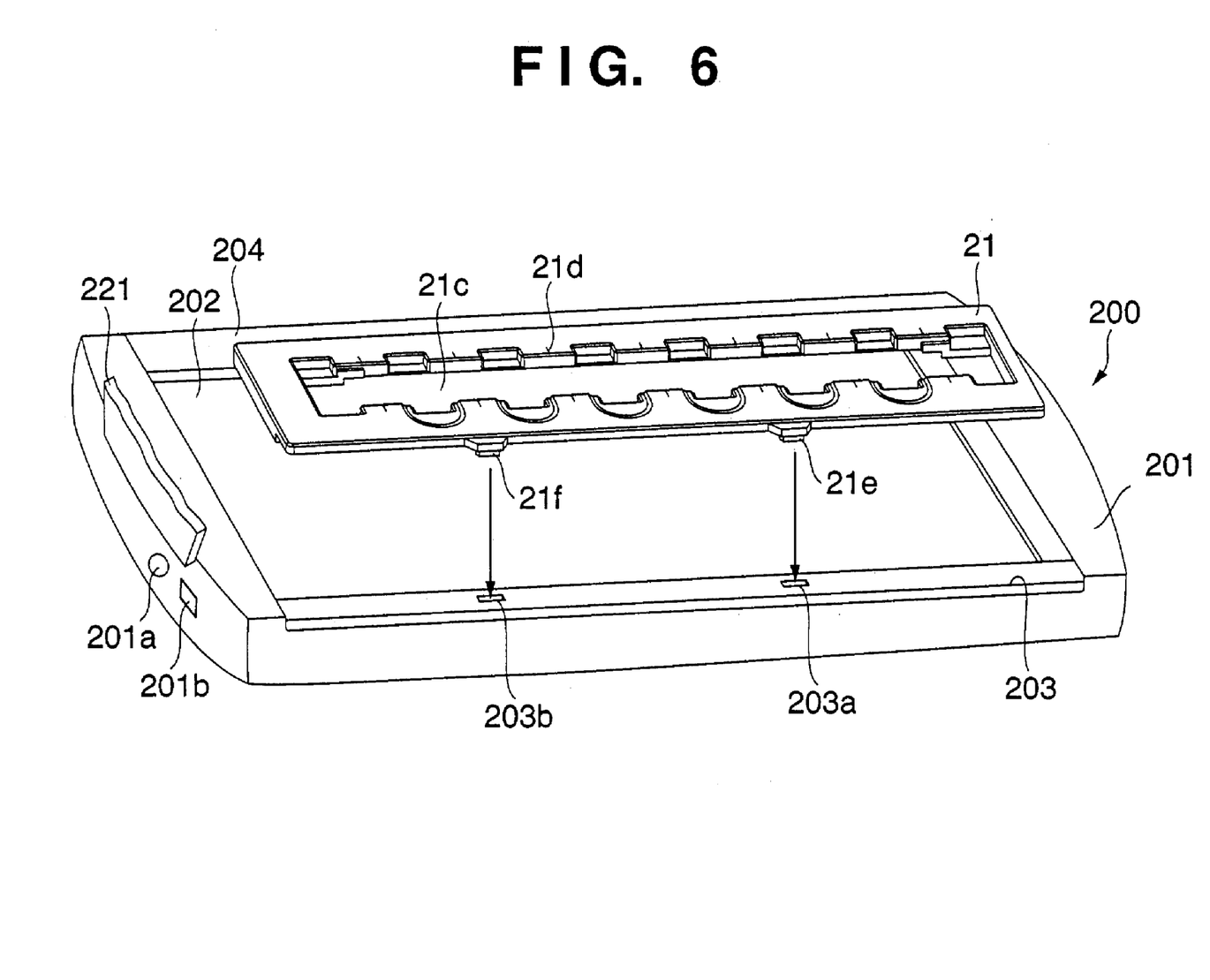
FIG. 6 is a view showing a state wherein a film holder is to be attached to a scanner main body according to the second embodiment of the present invention.

FIG. 6 is a view showing a state wherein the film holder 21 is to be attached to the scanner main body 200. The film holder 21 has pawls 21e and 21f. The glass frame 203 has recessed portions 203a and 203b which engage with the pawls 21e and 21f. The user can position the film holder 21 in the main scanning direction and sub-scanning direction by fitting the pawls 21e and 21f in the recessed portions 203a and 203b, respectively. The film holder 21 is vertically positioned as it is placed on the original glass plate 202 by its own weight. Since the film holder 21 is fixed by fitting the pawls 21e and 21f in the recessed portions 203a and 203b of the glass frame 203, displacement of the film holder 21 can easily be prevented. Reference numeral 201a denotes a connector terminal for the transparent original irradiation unit 22; and 201b, a connector terminal to be connected to an external information processing apparatus such as a personal computer (not shown).

Figure 7:
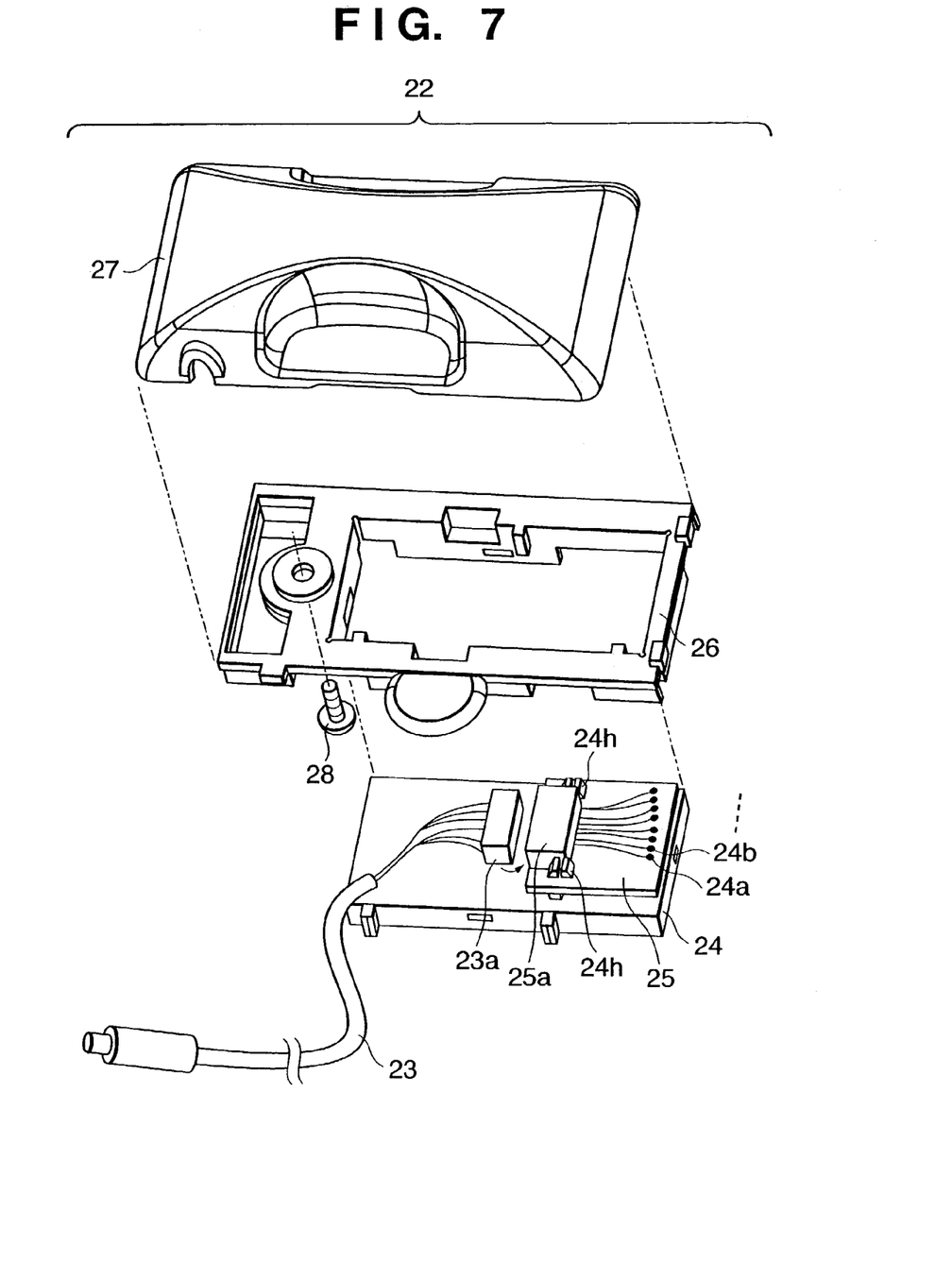
FIG. 7 is an exploded view of a transparent original irradiation unit according to the second embodiment of the present invention.

FIG. 7 is an exploded view showing an example of the transparent original irradiation unit 22. A plane light source 24 incorporates R, G, B, and infrared LEDs. Terminals 24a, 24b, . . . of the LEDs are soldered to the pattern of a board 25 and connected to a connector 25a on the board 25. The board 25 is fixed by pawls 24h of the plane light source 24.

The plane light source 24 is inserted and fixed to a base 26. A connector portion 23a of the cable 23 is fitted in a connector 25a on the board 25. A cover 27 is fixed to the base 26 by a screw 28.

The user positions the film holder 21 by attaching it to the scanner main body 200 in the above-described way. After that, as shown in FIG. 5, the user inserts the film F into a hollow portion 21c of the film holder 21 and aligns a frame of the film to a positioning index 21d, thereby positioning the film.

Figure 8:
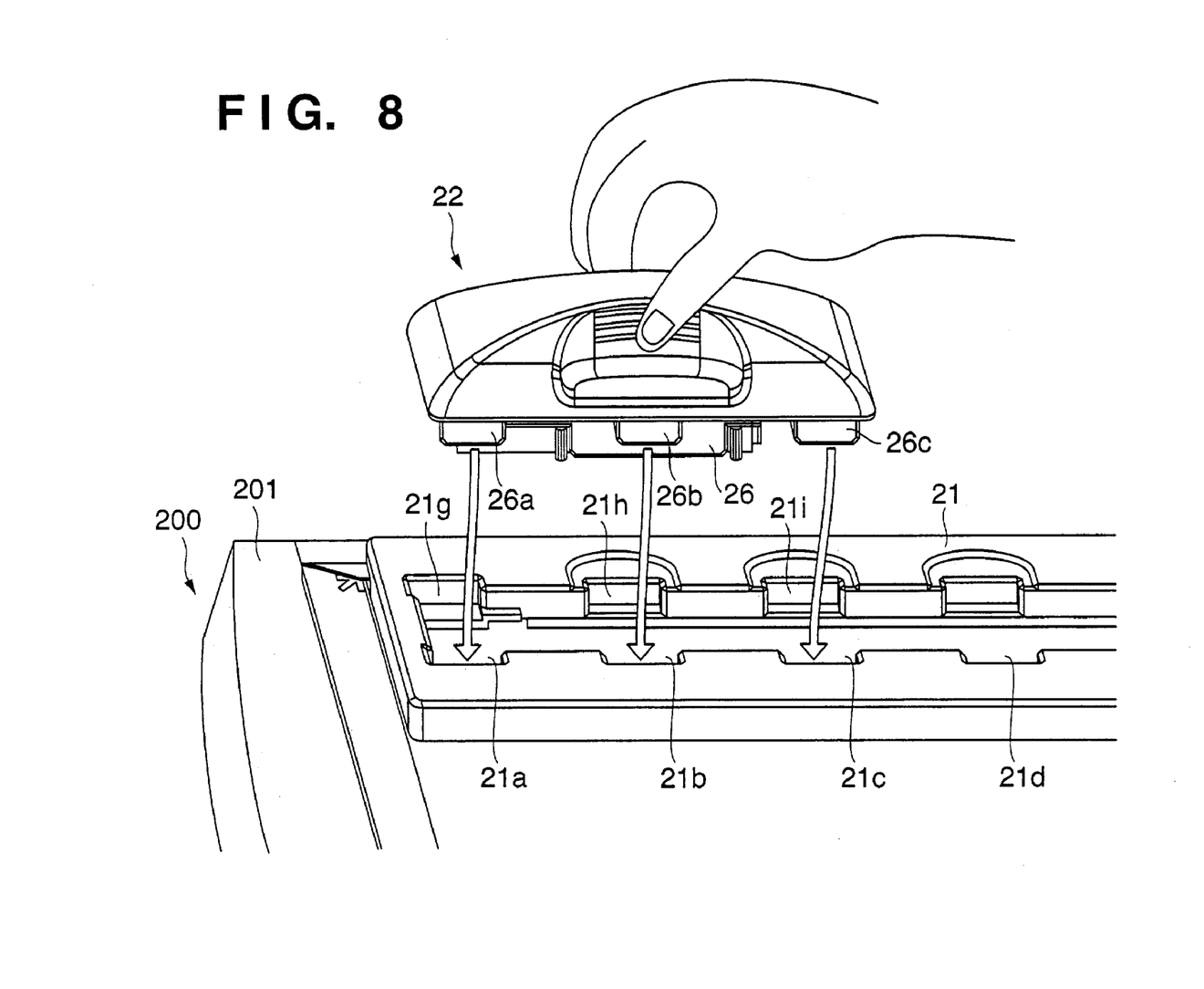
FIG. 8 is a view showing a state wherein the transparent original irradiation unit is fitted in the film holder according to the second embodiment of the present invention.
Figure 9:
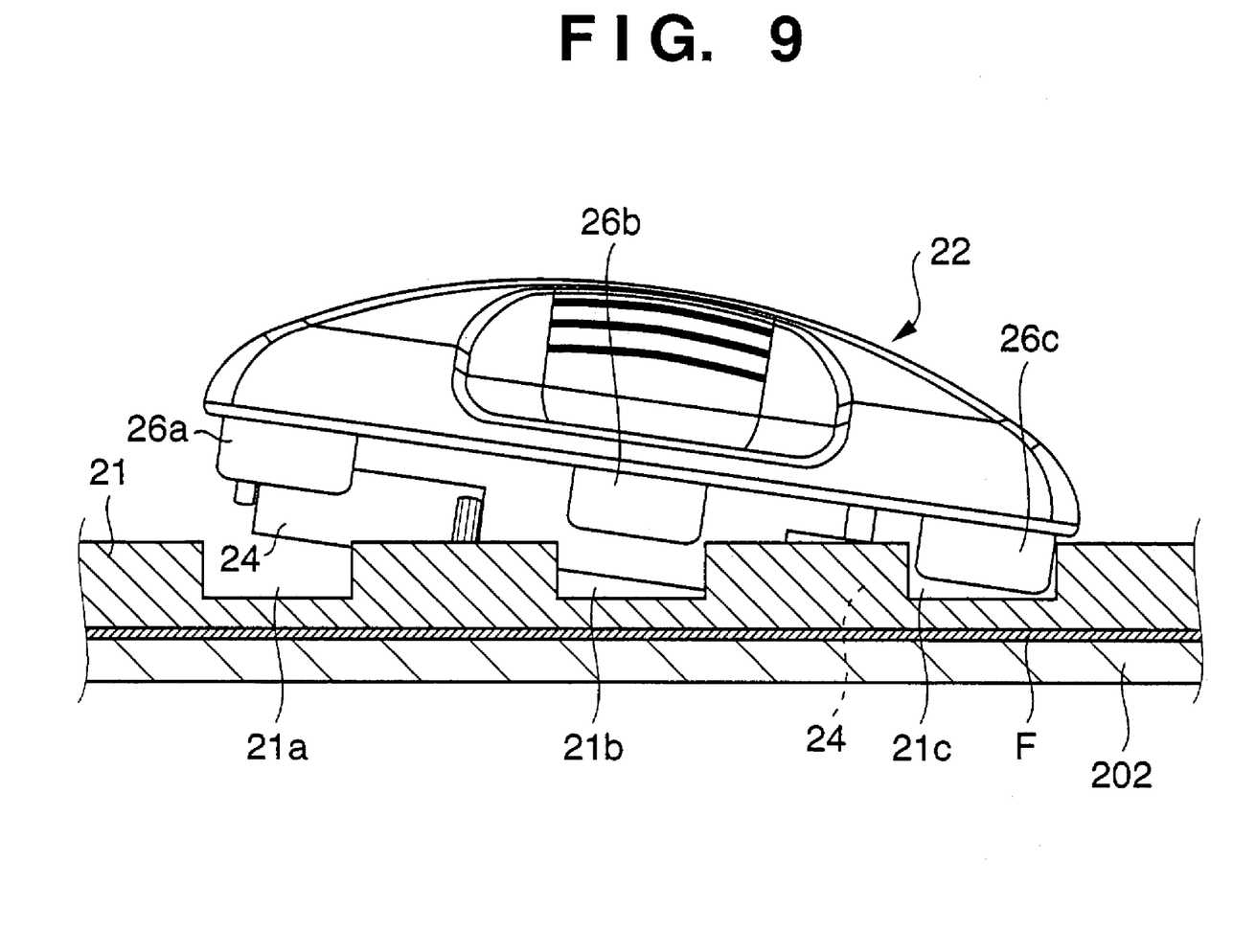
FIG. 9 is a view showing operation of tilting to insert the transparent original irradiation unit into the film holder according to the second embodiment of the present invention.
Figure 10:
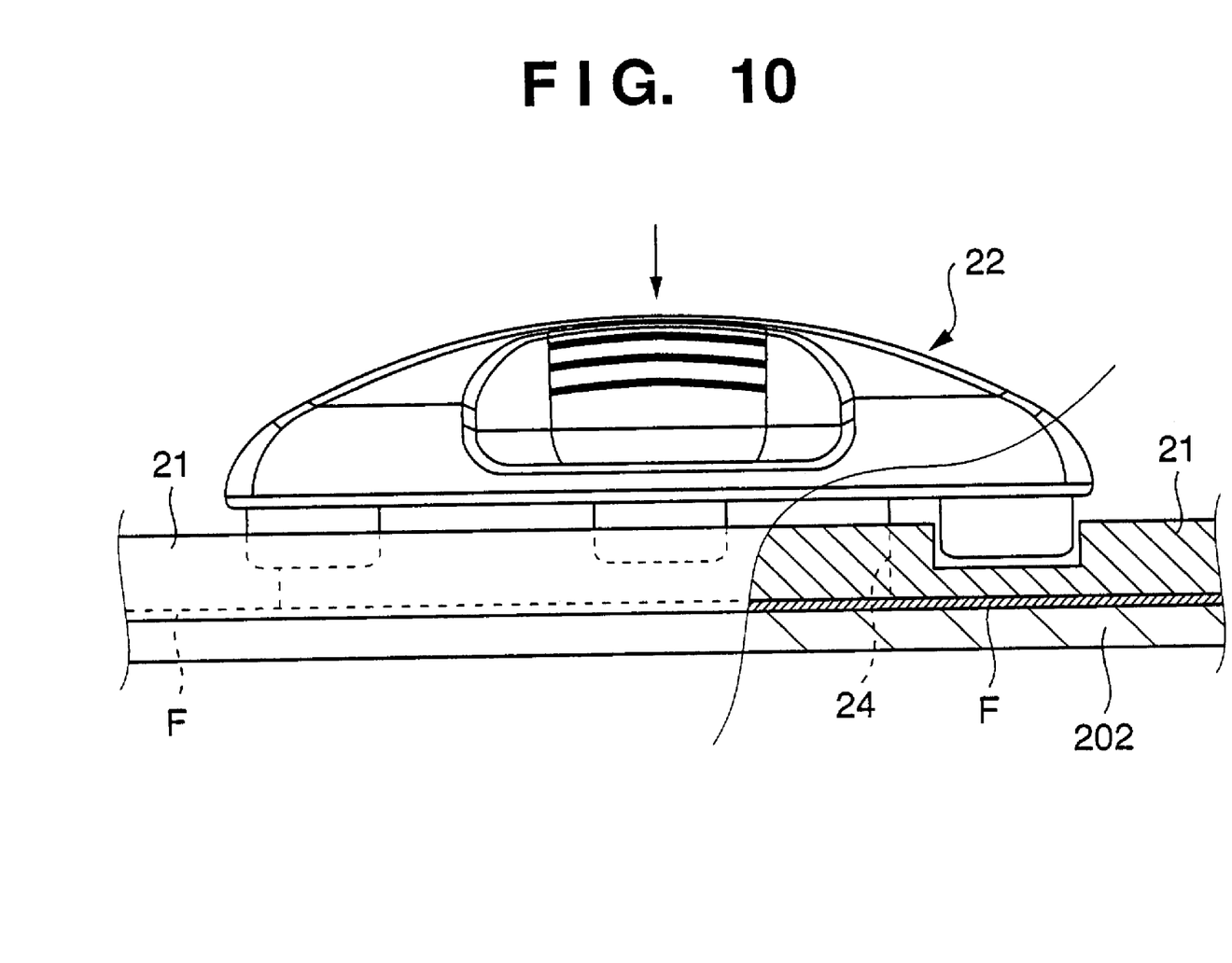
FIG. 10 is a view showing a state wherein the plane light source of the transparent original irradiation unit according to the second embodiment of the present invention comes into two-dimensional contact with a film.

The cable 23 of the transparent original irradiation unit 22 is inserted into the connector terminal 201a for the transparent original irradiation unit shown in FIG. 6. Next, as shown in FIG. 8, projecting portions 26a, 26b, and 26c of the base 26 of the transparent original irradiation unit 22 are fitted in recessed portions 21a, 21b, and 21c of the film holder 21. At this time, since the end portion of the projecting portion 26c of the base 26 has substantially the same width of the recessed portion 21c of the film holder 21, when the transparent original irradiation unit 22 is obliquely inserted, the plane light source 24 can not reach the film F before the plane light source 24 is made parallel to the film, as shown in FIG. 10. In this manner, it is possible to prevent the film F from being scratched by the edge of the end portion of the plane light source 24

Figure 11:
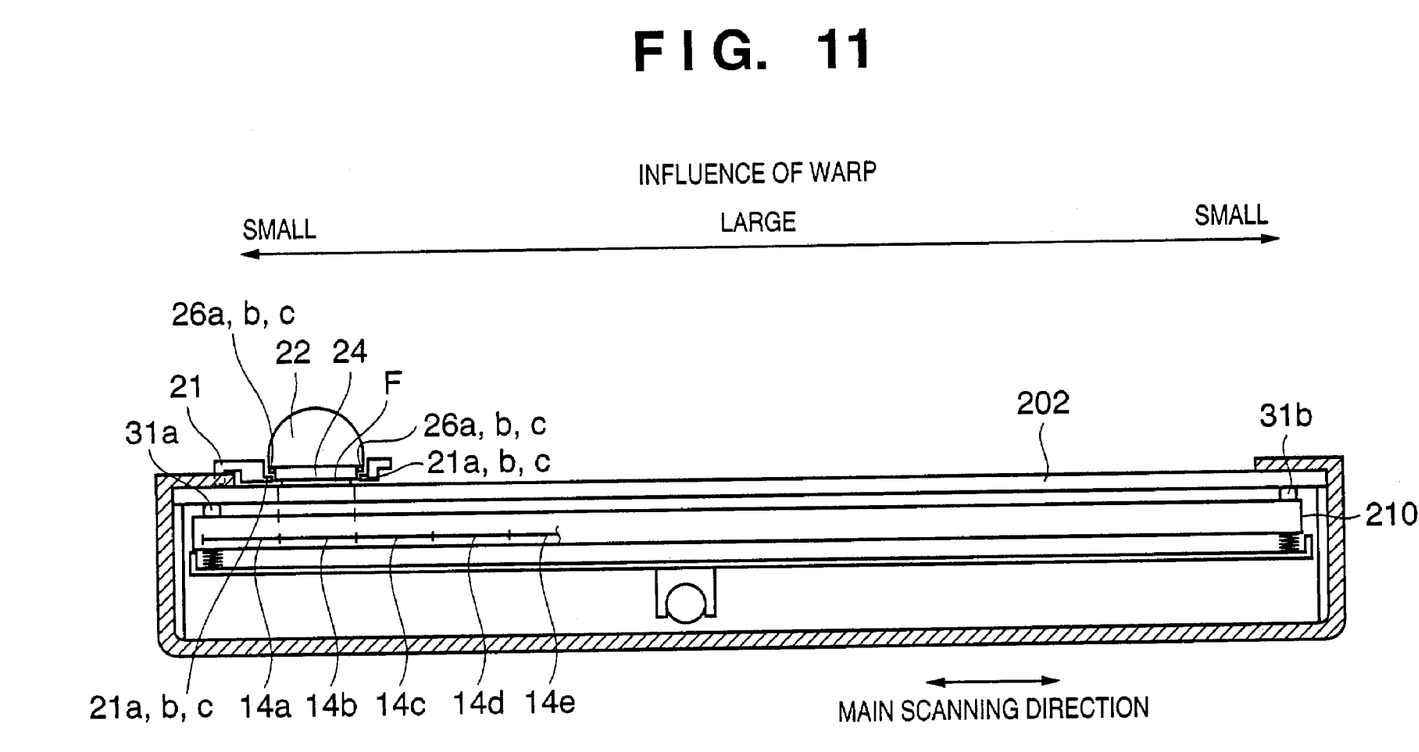
FIG. 11 is a sectional view showing the relationship between spacers, an image sensing element array, and the transparent original irradiation unit according to the second embodiment of the present invention.

FIG. 11 is a sectional view along the main operation direction wherein the film holder 21 and transparent original irradiation unit 22 are attached to the image reading apparatus. As shown in FIG. 11, the plane light source 24 is designed to come into contact with the original glass plate 202 before the projecting portions 26a, 26b, and 26c of the base 26 come into contact with the lower surfaces of the recessed portions 21a, 21b, and 21c of the film holder 21. Hence, even when the film warps, it is flattened and adhered to the glass by the weight of the entire transparent original irradiation unit 22 through the plane light source 24.

Figure 12:
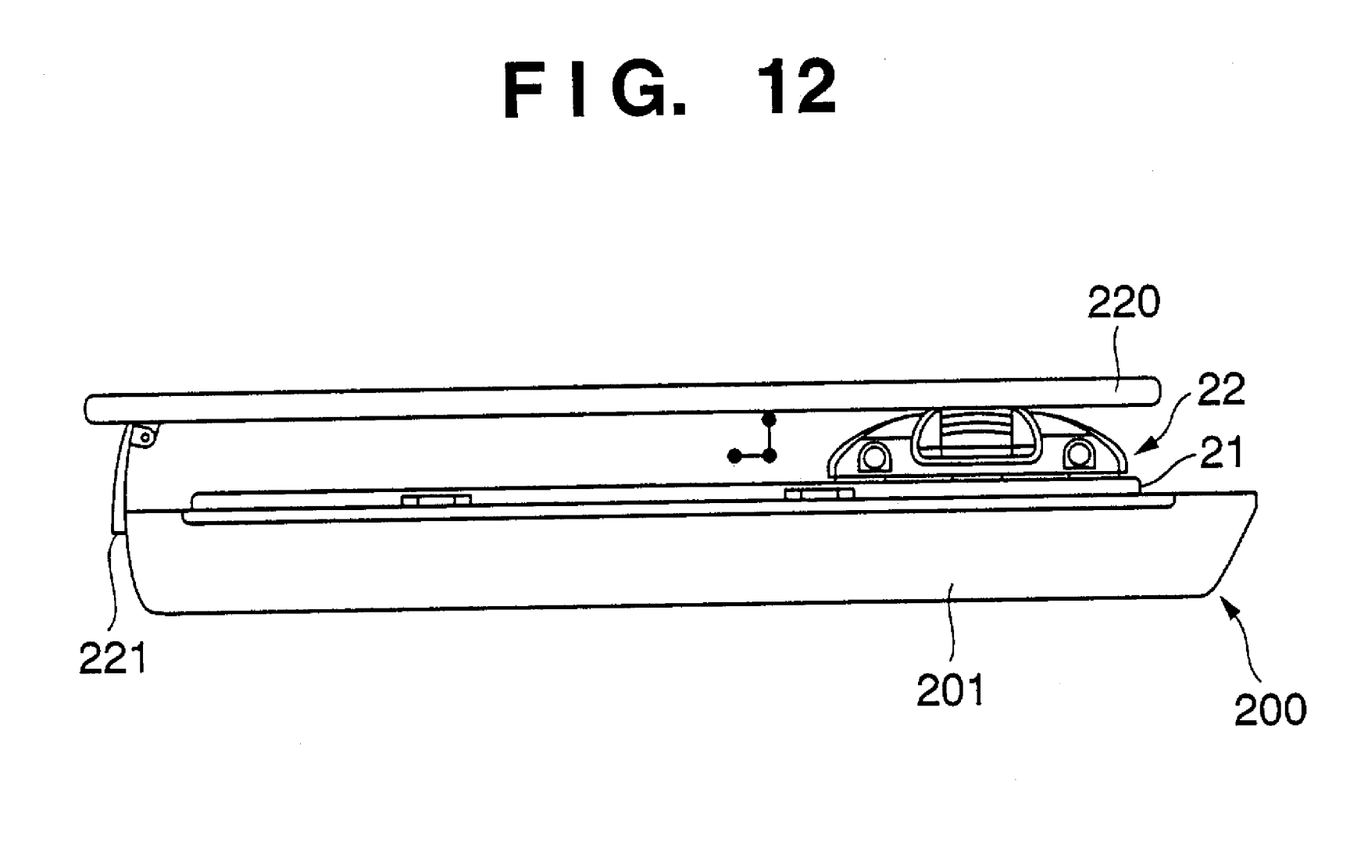
FIG. 12 is a view showing a state wherein a platen cover of the image reading apparatus is closed in reading a transparent original according to the second embodiment of the present invention.

After the film holder 21 and transparent original irradiation unit 22 are set in the above-described manner, the platen cover 220 is closed, as shown in FIG. 12. FIG. 12 is a side view of the image reading apparatus. Accordingly, the mass of the platen cover 220 is transmitted to the film through the transparent original irradiation unit 22, so an effect for further correcting warping of the film can be obtained.

When the user clicks on the start button on a personal computer (not shown) or presses the start button (not shown) of the image reading apparatus, the plane light source 24 sequentially turns on the R, G, and B LEDs. The image reading unit 210 incorporated in the scanner main body 200 reads the image of the film while scanning in the direction of an arrow A in FIG. 5. At this time, the lamp of the image reading unit 210 is OFF.

The image reading unit 210 uses a rod lens array to read an image in 1× magnification, and the depth of field of the image reading unit 210 is much smaller, because of its structure, than that of an image read unit which uses a conventional CCD sensor that is widely used. For this reason, if the film is not in contact with the surface of the original glass plate, no satisfactory read image can be obtained. In the second embodiment, the film is prevented from not being in contact with the surface of the original glass plate 202 by pressing the film by the above-described method, thereby obtaining a good image. Simultaneously, it is also important to guarantee the distance between the original glass plate 202 and the image reading unit 210.

As shown in FIG. 11, spacers 31a and 31b are inserted between the image reading unit 210 and original glass plate 202 at the two end portions of the image reading unit 210 to maintain the interval between the original mount surface of the original glass plate 202 and the light-receiving surface of the image reading unit 210. The image reading unit 210 and original glass plate 202 have a warp (generally, 0.2 to 0.4 mm at maximum) because of manufacturing processes. Hence, a read image is rather out of focus at the central portion of the linear image sensor 14 than at the two end portions of the linear image sensor 14 where the interval is guaranteed by the spacers 31a and 31b. For this reason, a sharp image can be obtained when the film is placed at an end portion. In the second embodiment, since a part of the endmost photoelectric conversion element array is outside of image reading region, the photoelectric conversion element array next to the endmost array of the photoelectric conversion element arrays is used to read a film.

The image reading unit 210 requires a reading-element having the same width as that of an original in the main-scanning direction as shown in FIG. 5. Since such a long element cannot be implemented because of manufacturing processes, the reading element is formed by arranging a plurality of photoelectric conversion element arrays as described with reference to FIG. 2. As described above, the length of each of photoelectric conversion element arrays 14a to 14h is slightly larger than the width of the 35-mm photographic film. To prevent the joints between the photoelectric conversion element arrays from appearing on an image obtained by reading the film, the film is preferably placed such that its width is set within one photoelectric conversion element array. In the second embodiment, the film holder 21 is arranged to be positioned in the main scanning direction by fitting the pawls 21e and 21f of the film holder 21 in the recessed portions 203a and 203b of the glass frame 203 whereby the width of the film is entirely set within the width of any one of the photoelectric conversion element arrays 14a to 14h.

As described above, pawls are formed on the film holder, and recessed portions engaging with the pawls are formed in the glass frame so as to position the film holder 21 at an end portion of the original glass plate in the main-scanning direction and set the width of the film in one photoelectric conversion element array. With this arrangement, even when the image reading unit having a linear image sensor formed by arranging a plurality of photoelectric conversion element arrays is used, a high-quality sharp image without any discontinuous portions can easily and reliably be obtained. Further, when lenses, such as those used in a rod lens array, having shallow depth of field are employed, a focused image is obtained.

In the second embodiment, recessed portions are formed in the glass frame along the sub-scanning direction (longitudinal direction of the image reading apparatus) to be engaged with the pawls 21e and 21f of the film holder 21. However, any other design that makes recessed portions engage with pawls along the main scanning direction (widthwise direction of the image reading apparatus), or along both the main and sub-scanning directions can also be employed.

The present invention is not limited to the above embodiments and various changes and modifications can be made within the spirit and scope of the present invention. Therefore, to apprise the public of the scope of the present invention, the following claims are made.

What is claimed is:

1. An image reading apparatus which reads an image of an original placed on an original glass plate comprising:
    an image reading unit having a plurality of photoelectric conversion element arrays which are linearly arranged in a main scanning direction, each photoelectric conversion element array including photoelectric conversion elements aligned in the main scanning direction;
    a driving section which makes said image reading unit move in a sub-scanning direction which is perpendicular to said main scanning direction; and
    a positioning member used for indicating a position, on the original glass plate to place the original, which indicates an area of the original glass plate where one of the plurality of photoelectric conversion element arrays scans when the image reading unit is moved by said driving section to scan in the sub-scanning direction.

2. The apparatus according to claim 1, wherein said positioning member comprises
    a transparent original holder which holds a transparent original while limiting the position of the transparent original in the main scanning direction when the transparent original is placed on the original glass plate, and
    an indicating member which indicates a position of said transparent original holder so that an effective image area of the transparent original is set within the area of the original glass plate.

3. The apparatus according to claim 2, wherein said transparent original holder has a projecting portion, and said indicating member has a recessed portion which engages with said projecting portion to indicate the position of said transparent original holder.

4. The apparatus according to claim 3, characterized in that said indicating member positions said transparent original holder near the end portion of said image reading unit in the main-scanning direction.

5. The apparatus according to claim 2 further comprises a plane light source which illuminates the transparent original from an opposite side of said image reading unit with respect to said original glass plate, wherein said plane light source presses the transparent original against said original glass plate by its own weight.

6. The apparatus according to claim 1, wherein said positioning member is a member having a mark that indicates ends of the respective photoelectric conversion element arrays.

7. The apparatus according to claim 1, wherein said positioning member includes a member which positions the original in a subscanning direction.

* * * * *

UNITED STATES PATENT AND TRADEMARK OFFICE
CERTIFICATE OF CORRECTION

PATENT NO.       : 7,379,217 B2                                   Page 1 of 1
APPLICATION NO.  : 10/422510
DATED            : May 27, 2008
INVENTOR(S)      : Mitsuru Amimoto and Tsuyoshi Yamauchi It is certified that error appears in the above-identified patent and that said Letters Patent is hereby corrected as shown below:

On the Title page of the issued patent

In the Inventors (75), please replace the first named inventor's name (i.e., Mitsura Amimoto) with -- Mitsuru Amimoto --

Signed and Sealed this

Twenty-ninth Day of July, 2008

JON W. DUDAS
*Director of the United States Patent and Trademark Office*